(12) United States Patent
Niu et al.

(10) Patent No.: US 12,199,682 B2
(45) Date of Patent: Jan. 14, 2025

(54) METHOD AND APPARATUS FOR NONLINEARLY CALIBRATING LINEAR FREQUENCY MODULATION OF OPTICAL SIGNAL, AND MEDIUM AND DEVICE THEREOF

(71) Applicant: SUTENG INNOVATION TECHNOLOGY CO., LTD., Shenzhen (CN)

(72) Inventors: Ben Niu, Shenzhen (CN); Jing Wang, Shenzhen (CN); Lin Zhu, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 144 days.

(21) Appl. No.: 17/983,355

(22) Filed: Nov. 8, 2022

(65) Prior Publication Data
US 2023/0208527 A1    Jun. 29, 2023

(30) Foreign Application Priority Data
Dec. 24, 2021    (CN) .......................... 202111608390.7

(51) Int. Cl.
*H04B 10/548*    (2013.01)
*H04B 10/564*    (2013.01)
(Continued)

(52) U.S. Cl.
CPC ......... *H04B 10/548* (2013.01); *H04B 10/564* (2013.01); *H04B 10/40* (2013.01); *H04B 10/60* (2013.01)

(58) Field of Classification Search
None
See application file for complete search history.

(56) References Cited

U.S. PATENT DOCUMENTS 4,612,671 A * 9/1986 Giles .................... H04B 10/564
372/31
4,979,234 A * 12/1990 Agrawal ............ H04B 10/2914
359/344

(Continued)

FOREIGN PATENT DOCUMENTS

CN    111562564 A  *  8/2020  ............. G01S 17/34
WO    2021226630 A1    11/2021

OTHER PUBLICATIONS

European Search Report issued in related European Application No. EP22214143.4, mailed May 3, 2023, 11 pages.

*Primary Examiner* — Darren E Wolf
(74) *Attorney, Agent, or Firm* — BAYES PLLC

(57) ABSTRACT

This disclosure provides a method for nonlinearly calibrating linear frequency modulation of an optical signal, an apparatus for nonlinearly calibrating linear frequency modulation of an optical signal, a computer-readable storage medium, and an electronic device. The method includes: in an $i^{th}$ frequency modulation cycle, obtaining a relationship between a modulation voltage signal $V_i(t)$ input into a light source and an actual frequency signal $f_i(t)$ of an optical signal output by the light source, to obtain an actual association relationship $f_i(V)$ corresponding to the $i^{th}$ frequency modulation cycle, where i is a positive integer; based on a target frequency modulation signal $f_g(t)$ and the actual association relationship $f_i(V)$, determining a modulation voltage signal $V_j(t)$ corresponding to a $j^{th}$ frequency modulation cycle, where j is i+1; and inputting a modulation voltage signal $V_j(t)$ into the light source, to implement frequency modulation of the optical signal in the $j^{th}$ frequency modulation cycle.

9 Claims, 12 Drawing Sheets

(51) Int. Cl.
    *H04B 10/40*        (2013.01)
    *H04B 10/60*        (2013.01)

(56)            References Cited

U.S. PATENT DOCUMENTS 5,710,652   A  *   1/1998   Bloom .................. H04B 10/118
                                                              398/42
    5,784,184   A  *   7/1998   Alexander ............. H04B 10/29
                                                              398/58
    2005/0140354 A1*   6/2005   Meir .................... H04B 17/309
                                                              324/76.22
    2011/0318021 A1*   12/2011  Zhou .................. H04L 27/0014
                                                              375/376
    2019/0025431 A1    1/2019   Satyan et al.
    2020/0233065 A1*   7/2020   Livezey ................... G01J 1/44

* cited by examiner

METHOD AND APPARATUS FOR NONLINEARLY CALIBRATING LINEAR FREQUENCY MODULATION OF OPTICAL SIGNAL, AND MEDIUM AND DEVICE THEREOF

CROSS-REFERENCE TO RELATED APPLICATION

The present application claims the benefit of priority to China Patent Application No. CN202111608390.7, filed on Dec. 24, 2021, the content of which is incorporated herein by reference in its entirety.

TECHNICAL FIELD

This disclosure relates to the technical field of signal processing, and in particular, to a method and apparatus for nonlinearly calibrating linear frequency modulation of an optical signal, a computer-readable storage medium, and an electronic device.

BACKGROUND

A LiDAR emits a laser beam to detect characteristics such as a position, or the like of a target. Specifically, the LiDAR performs linear frequency modulation on a continuous wave optical signal and divides light source output into local oscillator light and emitted light. The emitted light travels through space to a target surface and is reflected. A part of the reflected light is received by the LiDAR as an echo light, and the echo light and the local oscillator light are then mixed and received coherently. Because the echo light and the local oscillator light have different frequencies, the frequency of a beat frequency signal obtained through mixing is the frequency difference between the echo light and the local oscillator light. Because the linear frequency modulation is used, the frequency difference between the echo light and the local oscillator light is directly proportional to the space travel time of the emitted light or the echo light. Therefore, physical quantity information (for example, azimuth and height of the target relative to the LiDAR) about a target can be calculated by measuring the frequency of the beat frequency signal.

In the solution for performing linear frequency modulation on the continuous wave optical signal provided in a related art, the efficiency of nonlinearly calibrating frequency modulation is low.

It should be noted that the information disclosed in Background is only intended for promoting understanding of the background of this disclosure, and therefore, may include information other than the prior art known to a person of ordinary skills in the art.

SUMMARY

This disclosure aims to provide a method for nonlinearly calibrating linear frequency modulation of an optical signal, an apparatus for nonlinearly calibrating linear frequency modulation of an optical signal, a computer-readable storage medium, and an electronic device, to improve the efficiency of nonlinearly calibrating linear frequency modulation of an optical signal.

Other features and advantages of this disclosure should be readily understood based on the following detailed descriptions or be learned partially through the practice of this disclosure.

According to an aspect of this disclosure, a method for nonlinearly calibrating linear frequency modulation of an optical signal is provided, where the method includes: in an $i^{th}$ frequency modulation cycle, obtaining a relationship between a modulation voltage signal $V_i(t)$ input into a light source and an actual frequency signal $f_i(t)$ of an optical signal that is output by the light source, to obtain an actual association relationship $f_i(V)$ corresponding to $i^{th}$ the frequency modulation cycle, where i is a positive integer; based on a target frequency modulation signal $f_g(t)$ and the actual association relationship $f_i(V)$, determining a modulation voltage signal $V_j(t)$ corresponding to a $j^{th}$ frequency modulation cycle, where a value of j is i+1; and inputting a modulation voltage signal $V_j(t)$ into the light source, to implement frequency modulation of the optical signal in the $j^{th}$ frequency modulation cycle.

According to another aspect of this disclosure, an apparatus for nonlinearly calibrating linear frequency modulation of an optical signal is provided, where the apparatus includes: an obtaining module, a determining module, and a frequency modulation module.

The obtaining module is configured to: in an $i^{th}$ frequency modulation cycle, obtain a relationship between a modulation voltage signal $V_i(t)$ input into a light source and an actual frequency signal $f_i(t)$ of an optical signal that is output by the light source, to obtain an actual association relationship $f_i(V)$ corresponding to the $i^{th}$ frequency modulation cycle, where i is a positive integer; the determining module is configured to: based on a target frequency modulation signal $f_g(t)$ and the actual association relationship $f_i(V)$, determine a modulation voltage signal $V_j(t)$ corresponding to a $j^{th}$ frequency modulation cycle, where a value of j is i+1; and the frequency modulation module is configured to input a modulation voltage signal $V_j(t)$ into the light source, to implement frequency modulation of the optical signal in the $j^{th}$ frequency modulation cycle.

According to still another aspect of this disclosure, an electronic device is provided. The electronic device includes a memory, a processor, and a computer program stored in the memory and capable of running on the processor, where when the processor executes the computer program, the method for nonlinearly calibrating linear frequency modulation of an optical signal in the foregoing embodiments is implemented.

According to yet another aspect of this disclosure, a computer-readable storage medium is provided. The computer-readable storage medium stores a computer program, where when the computer program is executed by a processor, the method for nonlinearly calibrating linear frequency modulation of an optical signal in the foregoing embodiments is implemented.

The method for nonlinearly calibrating linear frequency modulation of an optical signal, the apparatus for nonlinearly calibrating linear frequency modulation of an optical signal, the computer-readable storage medium, and the electronic device have the following technical effects.

In the method for nonlinearly calibrating linear frequency modulation of an optical signal provided in this technical solution, the association relationship (for example, $f_i(V)$ corresponding to the $i^{th}$ frequency modulation cycle) between the modulation voltage and the actual frequency is first determined in the frequency modulation cycle, and an input modulation voltage required for a specific actual frequency may be determined based on the association relationship. Further, the foregoing association relationship is used to control the input modulation voltage in the subsequent frequency modulation cycle. In the technical solution provided in the embodiments, the input voltage value in each frequency modulation cycle can be controlled more accurately without many iterations, to achieve technical effects of a small amount of calculation and high timeliness, thereby improving the efficiency of nonlinearly calibrating linear frequency modulation of an optical signal.

It should be understood that the foregoing general descriptions and the following detailed descriptions are only exemplary and explanatory, and impose no limitation on this disclosure.

BRIEF DESCRIPTION OF DRAWINGS

The accompanying drawings herein are incorporated in this specification as a part of this specification, show embodiments in compliance with this disclosure, and are used together with this specification to illustrate this disclosure. Apparently, the accompanying drawings in the following descriptions show merely some embodiments of this disclosure, and a person of ordinary skill in the art may derive other drawings from these accompanying drawings without creative efforts.

DETAILED DESCRIPTION

Figure 1:
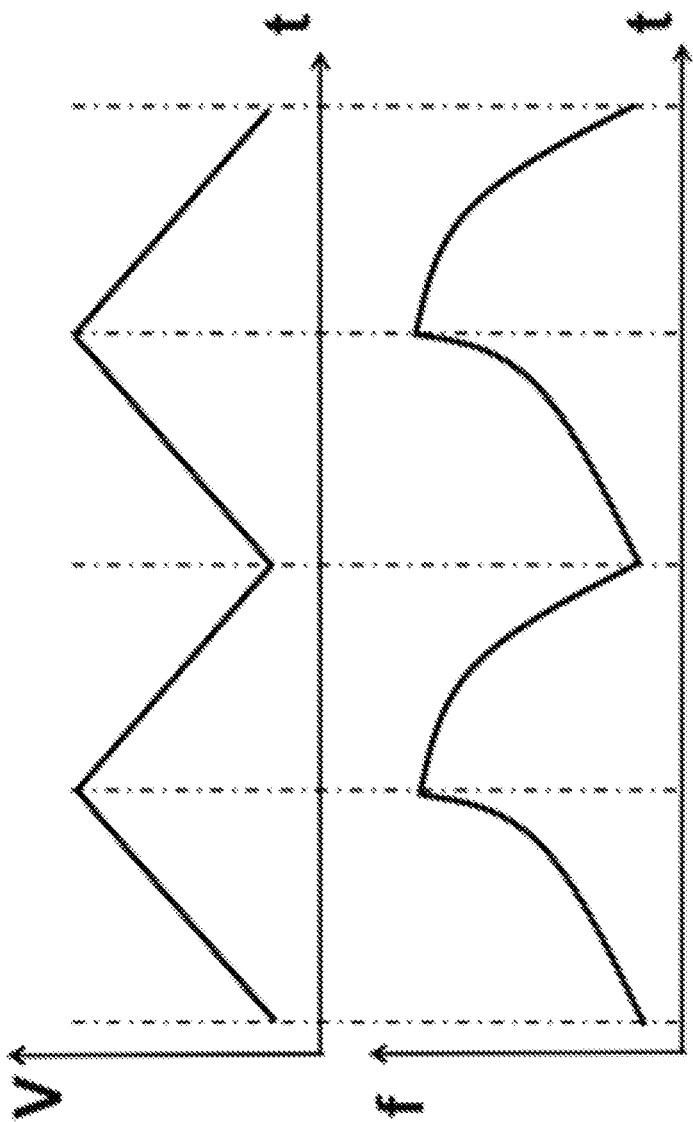
FIG. 1 is a schematic diagram of a relationship between the frequency of an output laser beam of a semiconductor laser device and the applied voltage of the semiconductor laser device.

To make objectives, technical solutions, and advantages of this disclosure clearer, embodiments of this disclosure are described in detail below with reference to the accompanying drawings.

When the following description refers to the drawings, unless otherwise indicated, the same numbers in different drawings indicate the same or similar elements. Implementations described in the following exemplary embodiments do not represent all the implementations consistent with those in this disclosure. On the contrary, the implementations are merely examples of devices and methods consistent with some aspects of this disclosure detailed in the appended claims.

The exemplary embodiments can be implemented in various forms and should not be construed as being limited to examples illustrated herein. The features, structures, or characteristics may be integrated with one or more embodiments in any applicable method. In the following descriptions, details are provided for ease of understanding of the embodiments of this disclosure. However, a person skilled in the art should understand that, to implement a technical solution in this disclosure, one or more specific details may be omitted, or other methods, components, apparatuses, steps, or the like may be used. In another case, widely-known technical solutions are not specifically shown or described to avoid redundancy.

In addition, the accompanying drawings are merely schematic diagrams of this disclosure and are not necessarily drawn to scale. The same reference signs in the figures denote the same or similar parts, and therefore are not described repeatedly. Some block diagrams shown in the figures are functional entities and are not necessarily corresponding to physically or logically independent entities. These functional entities may be implemented in a form of software or may be implemented in one or more hardware modules or integrated circuits, or in different networks and/or processor apparatuses and/or microcontroller apparatuses.

Embodiments of a method for nonlinearly calibrating linear frequency modulation of an optical signal provided in this disclosure are described in detail as follows with reference to FIG. 1 to FIG. 8.

The embodiments of this specification are applicable to an FMCW (Frequency Modulated Continuous Wave) LiDAR, and the FMCW LiDAR performs linear frequency modulation on a continuous wave optical signal, to measure a distance and a speed of a target with high accuracy. For example, the FMCW LiDAR performs triangular wave linear frequency modulation on the continuous wave optical signal and divides light source output into local oscillator light and emitted light. The emitted light travels through space to a target surface and is reflected, and a part of the reflected light is received by the LiDAR as an echo light.

The echo light and the local oscillator light are then mixed and received coherently. Because the echo light and the local oscillator light have different frequencies, the frequency of a beat frequency signal obtained through mixing is the frequency difference between the echo light and the local oscillator light. Because linear frequency modulation is used, the frequency difference between the echo light and the local oscillator light is directly proportional to the space travel time of the emitted light or the echo light. Therefore, the physical quantities of a target can be calculated by measuring the frequency of the beat frequency signal. In addition, if the target has a radial speed, different frequencies of beat frequency signals may be obtained by sweeping upward and downward, and the radial speed of the target can be obtained by calculating the difference between the two frequencies of beat frequency signals. It can be seen that the accuracy of ranging and speed measurement of FMCW LiDAR depends on the triangular wave linear frequency modulation of the light source.

For example, FIG. 1 is a schematic diagram of a relationship between the frequency of an output laser beam by a semiconductor laser device and an applied voltage.

For the FMCW LiDAR using the semiconductor laser device as the light source, the frequency of the output laser beam can be controlled by changing the magnitude of an injection current or the applied voltage, so as to perform linear frequency modulation on the light source. Referring to FIG. 1, the frequency modulation can be performed on the light source by inputting a triangular wave voltage V signal. However, the frequency signal f of the laser beam output from the semiconductor laser device and the applied voltage V are not in a linear relationship. It can be seen that the linear frequency modulation of the optical signal cannot be implemented through a standard triangular wave voltage signal.

In addition, when the frequency of the continuous wave optical signal of the FMCW LiDAR does not change linearly, the frequency of the beat frequency signal is no longer directly proportional to space round-trip travel time of the emitted light or the echo light, and a measurement result of the LiDAR deviates. Therefore, in order to enable the FMCW LiDAR to accurately measure speed and distance, it is necessary to control the input frequency modulation voltage signal, so as to perform nonlinearity calibration on the frequency modulation of the light source, thereby implementing the linear frequency modulation of the light source.

The embodiments of this specification are applicable to nonlinearity calibration of the frequency modulation of the continuous wave optical signal of the FMCW LiDAR.

Figure 2:
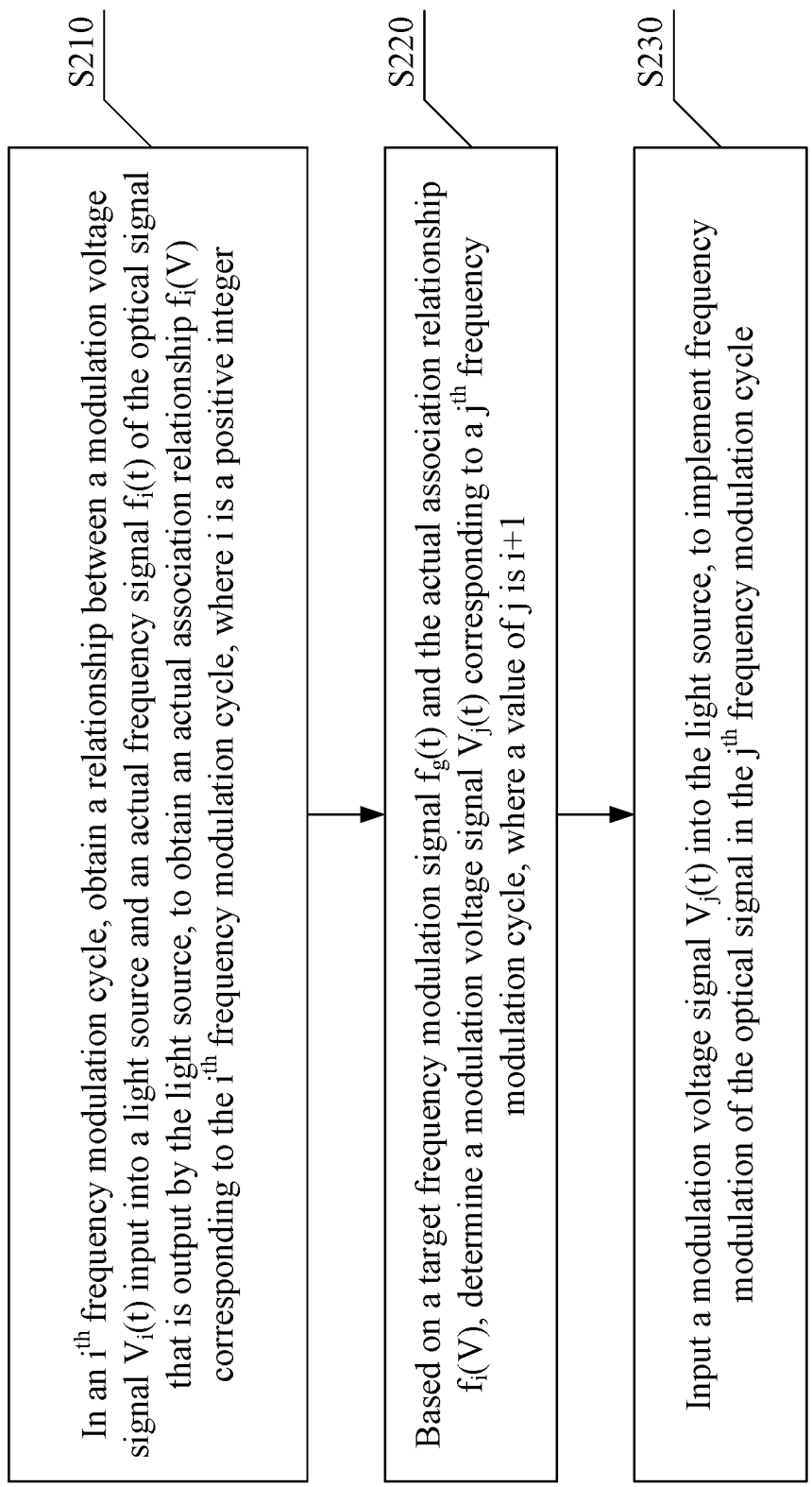
FIG. 2 is a schematic flowchart of a method for nonlinearly calibrating linear frequency modulation of an optical signal according to an exemplary embodiment of this disclosure.

In an exemplary embodiment, FIG. 2 is a schematic flowchart of a method for nonlinearly calibrating linear frequency modulation of an optical signal according to an exemplary embodiment of this disclosure. Referring to FIG. 2, the method includes the following steps.

S210. In an $i^{th}$ frequency modulation cycle, obtain a relationship between a modulation voltage signal $V_i(t)$ input into a light source and an actual frequency signal $f_i(t)$ of the optical signal that is output by the light source, to obtain an actual association relationship $f_i(V)$ corresponding to the $i^{th}$ frequency modulation cycle, where i is a positive integer.

S220. Based on a target frequency modulation signal $f_g(t)$ and the actual association relationship $f_i(V)$, determine a modulation voltage signal $V_j(t)$ corresponding to a $j^{th}$ frequency modulation cycle, where a value of j is i+1.

S230. Input a modulation voltage signal $V_j(t)$ into the light source, to implement frequency modulation of the optical signal in the $j^{th}$ frequency modulation cycle.

In the technical solution provided in the embodiment shown in FIG. 2, the association relationship $f_i(V)$ between the modulation voltage and the actual frequency is first determined in the $i^{th}$ frequency modulation cycle, and an input modulation voltage required for a specific actual frequency may be determined based on the association relationship. Further, the foregoing association relationship is used to control the input modulation voltage in the subsequent $j^{th}$ frequency modulation cycle. In some embodiments, a target frequency value corresponding to the target time point of the $j^{th}$ cycle is determined, and then the input modulation voltage required for the target frequency value is determined based on the association relationship $f_i(V)$. Therefore, the input voltage value in each frequency modulation cycle can be controlled more accurately, to achieve technical effects of a small amount of calculation and high timeliness, thereby improving the efficiency of nonlinearly calibrating linear frequency modulation of an optical signal.

It should be noted that the method shown in FIG. 2 is applicable to a state that the frequency value changes monotonically with time in each frequency modulation cycle, so that the same frequency value corresponds to one modulation voltage value in the same frequency modulation cycle.

Because this embodiment is applicable to linear frequency modulation of the continuous wave optical signal of the FMCW LiDAR, the foregoing light source in the embodiment shown in FIG. 2 is a laser device. In the following embodiments, the laser device is also used as the light source for description.

Figure 3:
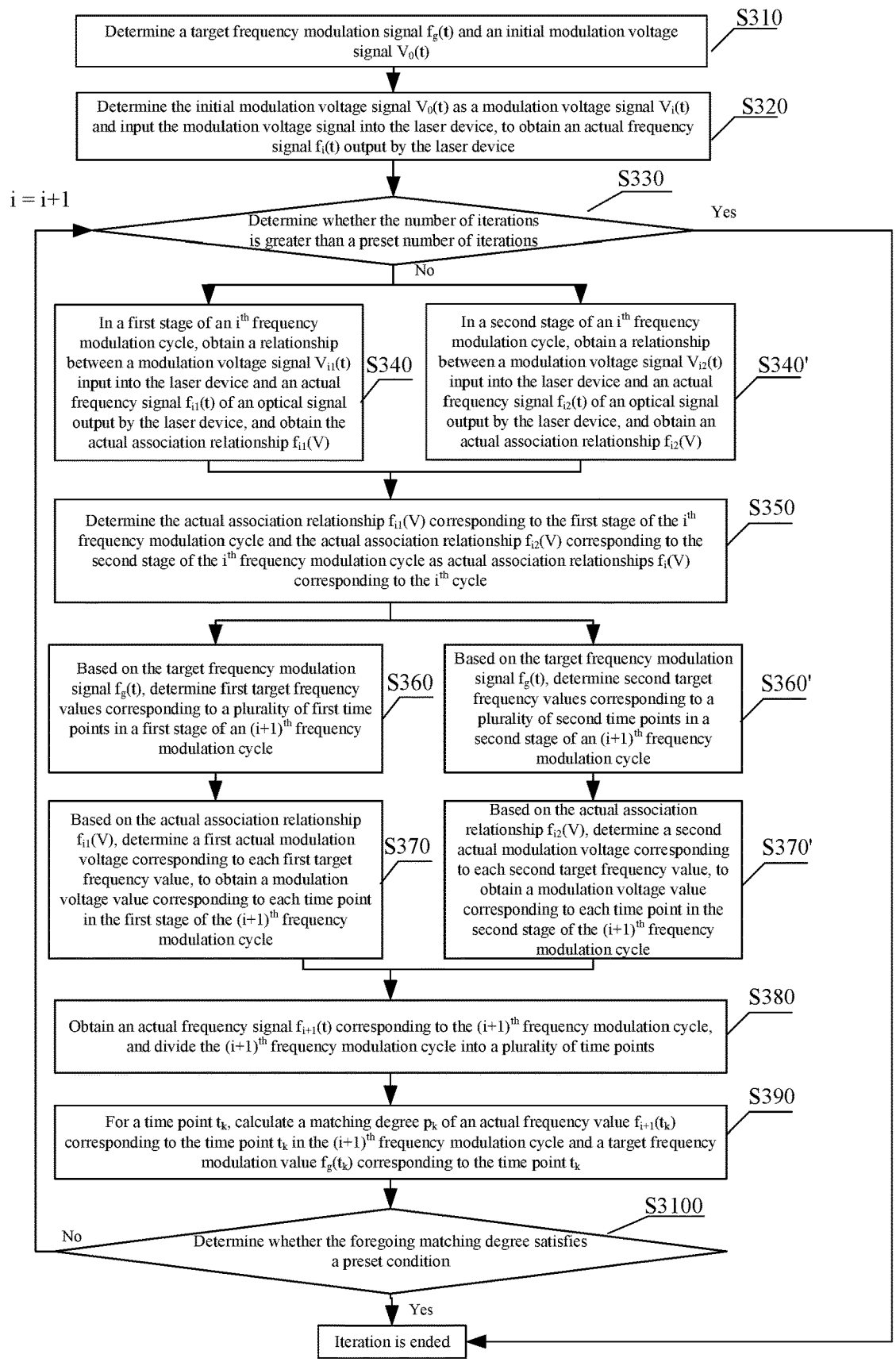
FIG. 3 is a schematic flowchart of a method for nonlinearly calibrating linear frequency modulation of an optical signal according to another exemplary embodiment of this disclosure.

In an exemplary embodiment, FIG. 3 is a schematic flowchart of a method for nonlinearly calibrating linear frequency modulation of an optical signal. Implementations of the embodiment shown in FIG. 2 are described in detail below with reference to FIG. 3.

Reference is made to FIG. 3. S310: Determine a target frequency modulation signal $f_g(t)$ and an initial modulation voltage signal $V_0(t)$. S320: Determine the initial modulation voltage signal $V_0(t)$ as a modulation voltage signal $V_i(t)$ and input the modulation voltage signal into the laser device, to obtain an actual frequency signal $f_i(t)$ output by the laser device.

For example, the foregoing target frequency modulation signal $f_g(t)$ is an output frequency of the laser device in an ideal state. The foregoing initial modulation voltage signal $V_0(t)$ is a voltage signal input in the first frequency modulation cycle (that is, i is 1). For example, the input voltage signal may be a standard triangular wave voltage signal. In a first frequency modulation cycle, after the foregoing initial modulation voltage signal $V_0(t)$ is input into the laser device, a frequency signal of the light output by the laser device, the actual frequency signal $f_1(t)$, can be obtained.

S330: Determine whether the number of iterations is greater than a preset number of iterations. In this embodiment, a user can set the maximum number of iterations as the foregoing preset number of iterations based on an actual need. After the number of iterations is greater than the preset number of iterations, the iterative calculation is stopped; and when the number of iterations is not greater than the preset number of iterations, the following iterative calculation process is performed.

S340: In a first stage of an $i^{th}$ frequency modulation cycle, obtain a relationship between a modulation voltage signal $V_{i1}(t)$ input into the laser device and an actual frequency signal $f_{i1}(t)$ of an optical signal output by the laser device, and obtain the actual association relationship $f_{i1}(V)$. S340': In a second stage of an $i^{th}$ frequency modulation cycle, obtain a relationship between a modulation voltage signal $V_{i2}(t)$ input into the laser device and an actual frequency signal $f_{i2}(t)$ of an optical signal output by the laser device, and obtain an actual association relationship $f_{i2}(V)$.

Figure 4:
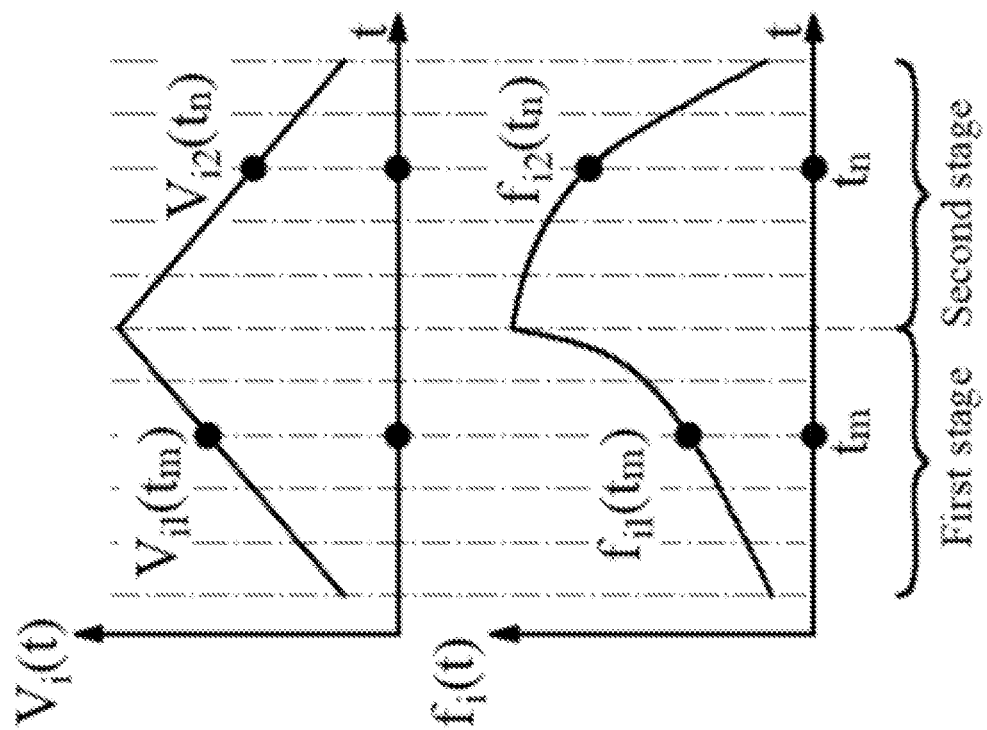
FIG. 4 is a schematic diagram of a comparison between a triangular wave voltage signal input into a laser device and a frequency signal output from the laser device according to an exemplary embodiment of this disclosure.

In this embodiment, a triangular wave shown in FIG. 4 is used as an example for description. That is, each frequency modulation cycle includes a first stage at which frequency increases with time monotonically and a second stage at which frequency decreases with time monotonically. Because one frequency modulation cycle is divided into two stages at which frequency values change monotonically with time, the relationship between the input modulation voltage signal and the output actual frequency signal is obtained for each stage, to obtain the actual association relationship $f_{i1}(V)$ corresponding to the first stage of the $i^{th}$ frequency modulation cycle and the actual association relationship $f_{i2}(V)$ corresponding to the second stage of the $i^{th}$ frequency modulation cycle.

Figure 5B:
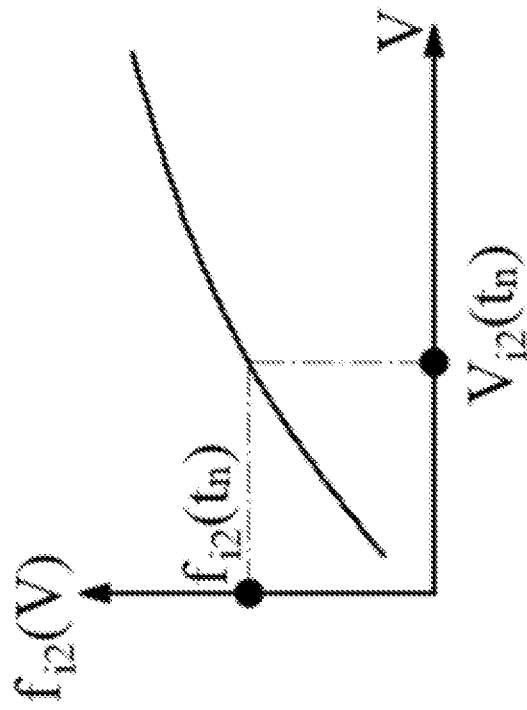
FIG. 5b is a schematic diagram of an actual association relationship $f_{i2}(V)$ corresponding to a second stage of an $i^{th}$ frequency modulation cycle according to an exemplary embodiment of this disclosure.
Figure 5A:
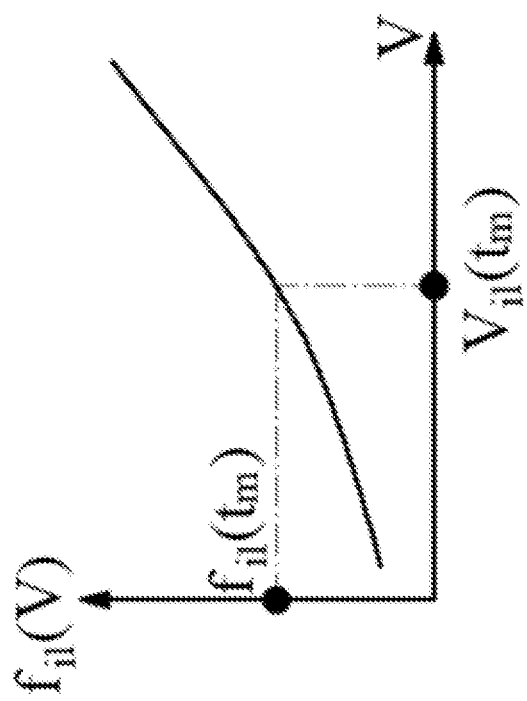
FIG. 5a is a schematic diagram of an actual association relationship $f_{i1}(V)$ corresponding to a first stage of an $i^{th}$ frequency modulation cycle according to an exemplary embodiment of this disclosure.

For example, referring to FIG. 4, the first stage and the second stage of the $i^{th}$ frequency modulation cycle each are divided into a plurality of time points. For a time point $t_m$ (m is 1, 2, . . . ) in the first stage of the $i^{th}$ frequency modulation cycle, the modulation voltage value $V_{i1}(t_m)$ and the actual frequency value $f_{i1}(t_m)$ corresponding to the time point $t_m$ are obtained, and further, based on $V_{i1}(t_m)$ and $f_{i1}(t_m)$ corresponding to each time point in the first stage, the actual association relationship $f_{i1}(V)$ (as shown in FIG. 5a) is determined. For a time point $t_n$ (n is 1, 2, . . . ) in the second stage of the $i^{th}$ frequency modulation cycle, the modulation voltage value $V_{i2}(t_n)$ and the actual frequency value $f_{i2}(t_n)$ corresponding to the time point $t_n$ are obtained, and further, based on $V_{i2}(t_n)$ and $f_{i2}(t_n)$ corresponding to each time point in the second stage, the actual association relationship $f_{i2}(V)$ (as shown in FIG. 5b) is determined.

Reference is further made to FIG. 3. S350: Determine the actual association relationship $f_{i1}(V)$ corresponding to the first stage of the $i^{th}$ frequency modulation cycle and the actual association relationship $f_{i2}(V)$ corresponding to the second stage of the $i^{th}$ frequency modulation cycle as actual association relationships $f_i(V)$ corresponding to the $i^{th}$ cycle.

Further, a modulation voltage value corresponding to each time point in a first stage of an $(i+1)^{th}$ frequency modulation cycle is determined through steps S360 and S370. Details are as follows.

In this embodiment, the value of j is i+1. That is, a modulation voltage signal in any frequency modulation cycle following the first frequency modulation cycle is determined based on an actual association relationship determined in a previous frequency modulation cycle.

S360: Based on the target frequency modulation signal $f_g(t)$, determine first target frequency values corresponding to a plurality of first time points in a first stage of an $(i+1)^{th}$ frequency modulation cycle. S370: Based on the actual association relationship $f_{i1}(V)$, determine a first actual modulation voltage corresponding to each first target frequency value, to obtain a modulation voltage value corresponding to each time point in the first stage of the $(i+1)^{th}$ frequency modulation cycle.

Figure 6:
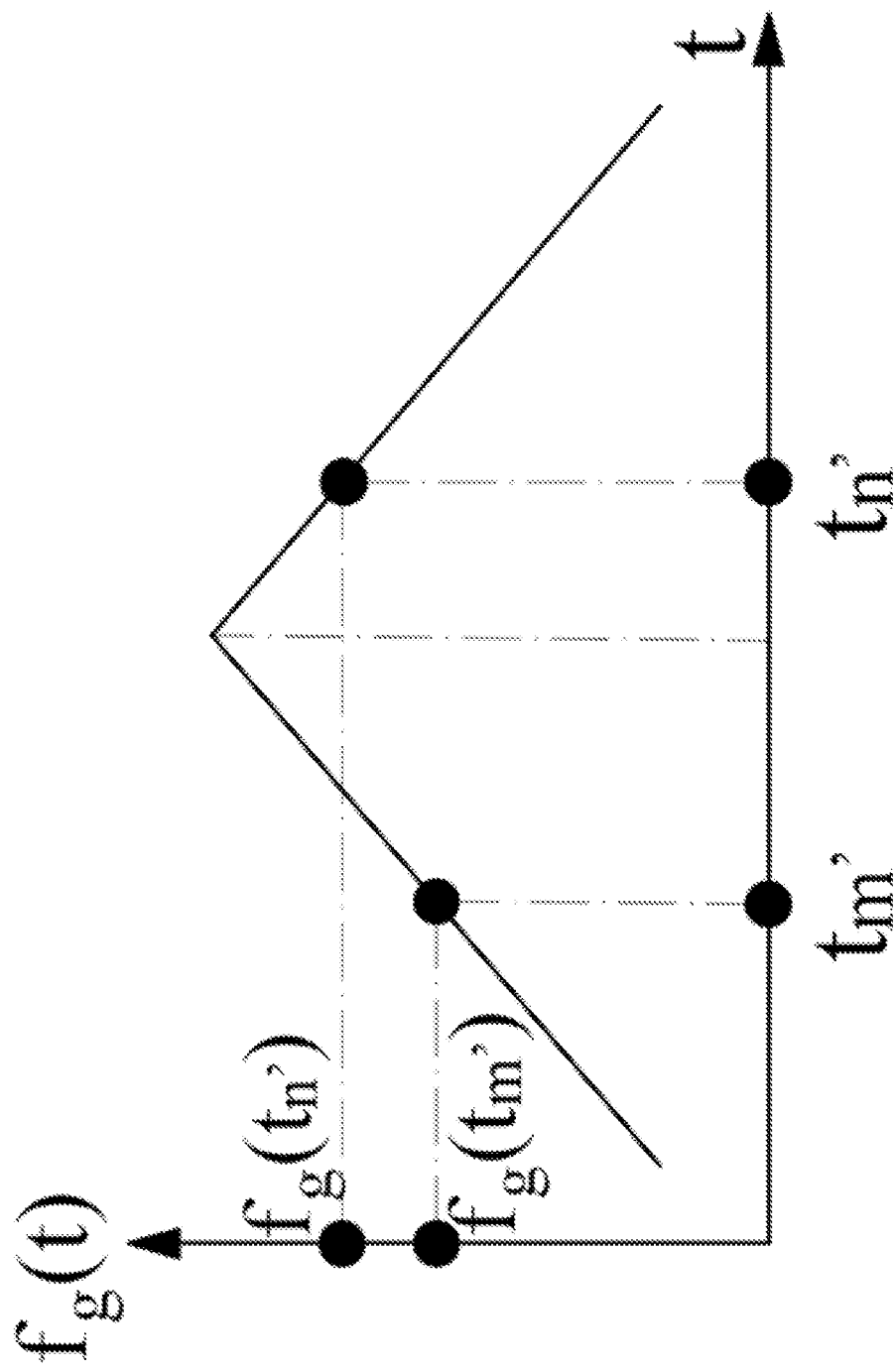
FIG. 6 is a schematic diagram of a curve of a target frequency modulation signal $f_g(t)$ according to an exemplary embodiment of this disclosure.
Figure 7B:
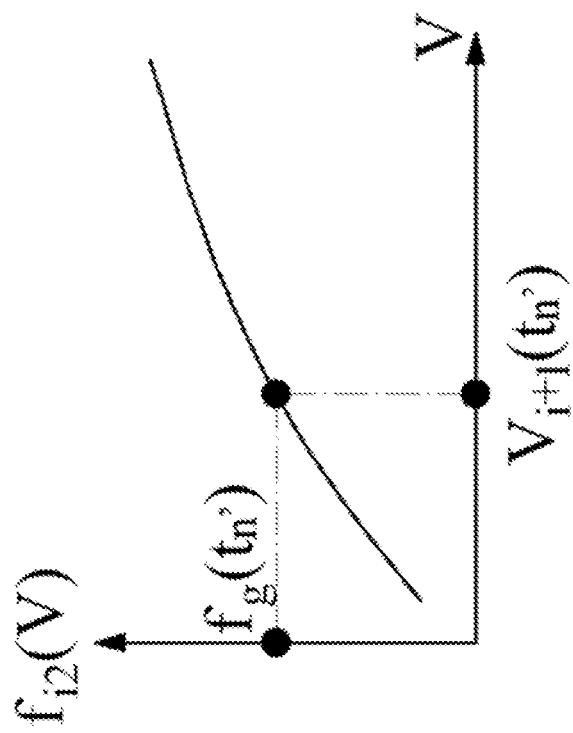
FIG. 7b is a schematic diagram of an actual association relationship $f_{i2}(V)$ corresponding to a second stage of an $i^{th}$ frequency modulation cycle according to another exemplary embodiment of this disclosure.
Figure 7A:
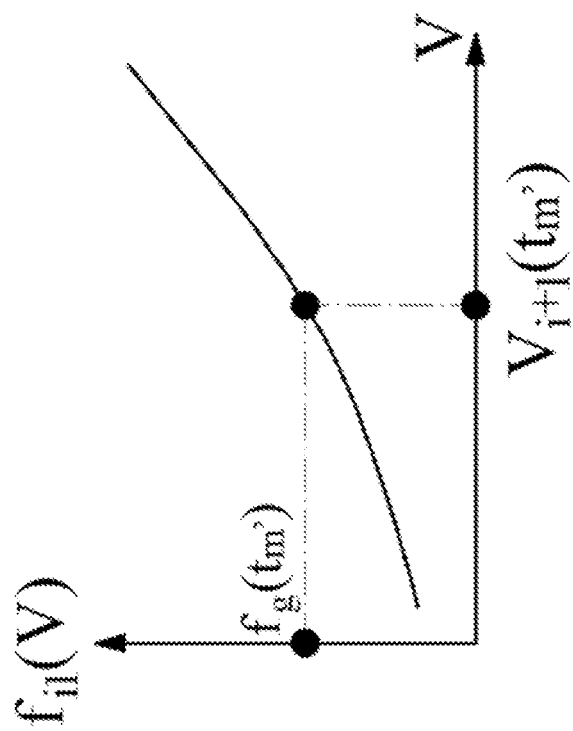
FIG. 7a is a schematic diagram of an actual association relationship $f_{i1}(V)$ corresponding to a first stage of an $i^{th}$ frequency modulation cycle according to another exemplary embodiment of this disclosure.

FIG. 6 is a schematic diagram of a curve of a target frequency modulation signal $f_g(t)$. For a first time point $t_m'$ in a first stage of an $(i+1)^{th}$ frequency modulation cycle, a first target frequency value $f_g(t_m')$ corresponding to $t_m'$ is determined based on a curve of the target frequency modulation signal $f_g(t)$ shown in FIG. 6. Further, referring to FIG. 7a, the first actual modulation voltage value $V_{i+1}(t_m')$ corresponding to the first target frequency value $f_g(t_m')$ is determined from a curve of the actual association relationship $f_{i1}(V)$. Therefore, an input voltage value corresponding to a first time point $t_m'$ in the first stage of the $(i+1)^{th}$ frequency modulation cycle is obtained. By analogy, a modulation voltage value corresponding to each time point in the first stage of the $(i+1)^{th}$ frequency modulation cycle is determined.

Reference is further made to FIG. 3. A modulation voltage value corresponding to each time point in the second stage of an $(i+1)^{th}$ frequency modulation cycle is determined through steps S360' and S370'. Details are as follows.

S360': Based on the target frequency modulation signal $f_g(t)$, determine second target frequency values corresponding to a plurality of second time points in a second stage of an $(i+1)^{th}$ frequency modulation cycle. S370': Based on the actual association relationship $f_{i2}(V)$, determine a second actual modulation voltage corresponding to each second target frequency value, to obtain a modulation voltage value corresponding to each time point in the second stage of the $(i+1)^{th}$ frequency modulation cycle.

Similar to the embodiment of determining the modulation voltage value corresponding to each time point in the first stage of the $(i+1)^{th}$ frequency modulation cycle, for example, for a second time point $t_n'$ in the second stage of the $(i+1)^{th}$ frequency modulation cycle, a second target frequency value $f_g(t_n')$ corresponding to $t_n'$ is determined based on a curve of the target frequency modulation signal $f_g(t)$ shown in FIG. 6. Further, referring to FIG. 7b, a second actual modulation voltage value $V_{i+1}(t_n')$ corresponding to a second target frequency value $f_g(t_n')$ is determined from a curve of an actual association relationship fi2(V). In this way, an input voltage value corresponding to the second time point $t_n'$ in the second stage of the $(i+1)^{th}$ frequency modulation cycle is obtained. By analogy, a modulation voltage value corresponding to each time point in the second stage of the $(i+1)^{th}$ frequency modulation cycle is determined.

Figure 8:
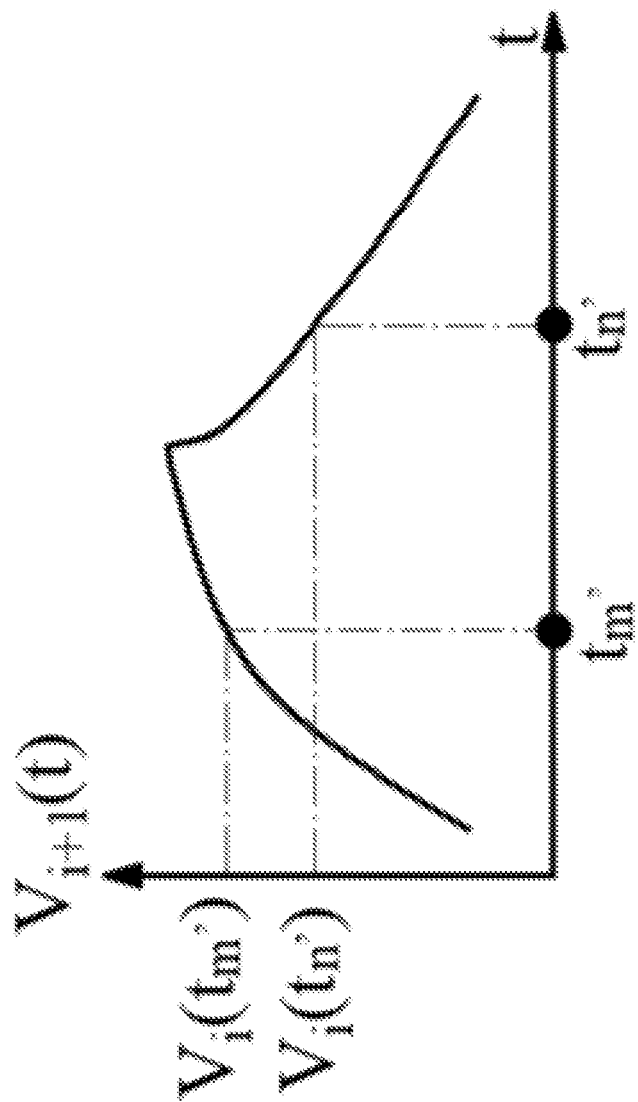
FIG. 8 is a schematic diagram of a modulation voltage signal $V_{i+1}(t)$ corresponding to an $(i+1)^{th}$ frequency modulation cycle according to an exemplary embodiment of this disclosure.

In an exemplary embodiment, reference is made to a modulation voltage signal $V_{i+1}(t)$ corresponding to the $(i+1)^{th}$ frequency modulation cycle shown in FIG. 8.

Referring to FIG. 3, after the modulation voltage signal $V_{i+1}(t)$ corresponding to the $(i+1)^{th}$ frequency modulation cycle is determined, the following step is performed. S380: Obtain an actual frequency signal $f_{i+1}(t)$ corresponding to the $(i+1)^{th}$ frequency modulation cycle, and divide the $(i+1)^{th}$ frequency modulation cycle into a plurality of time points.

Figure 9:
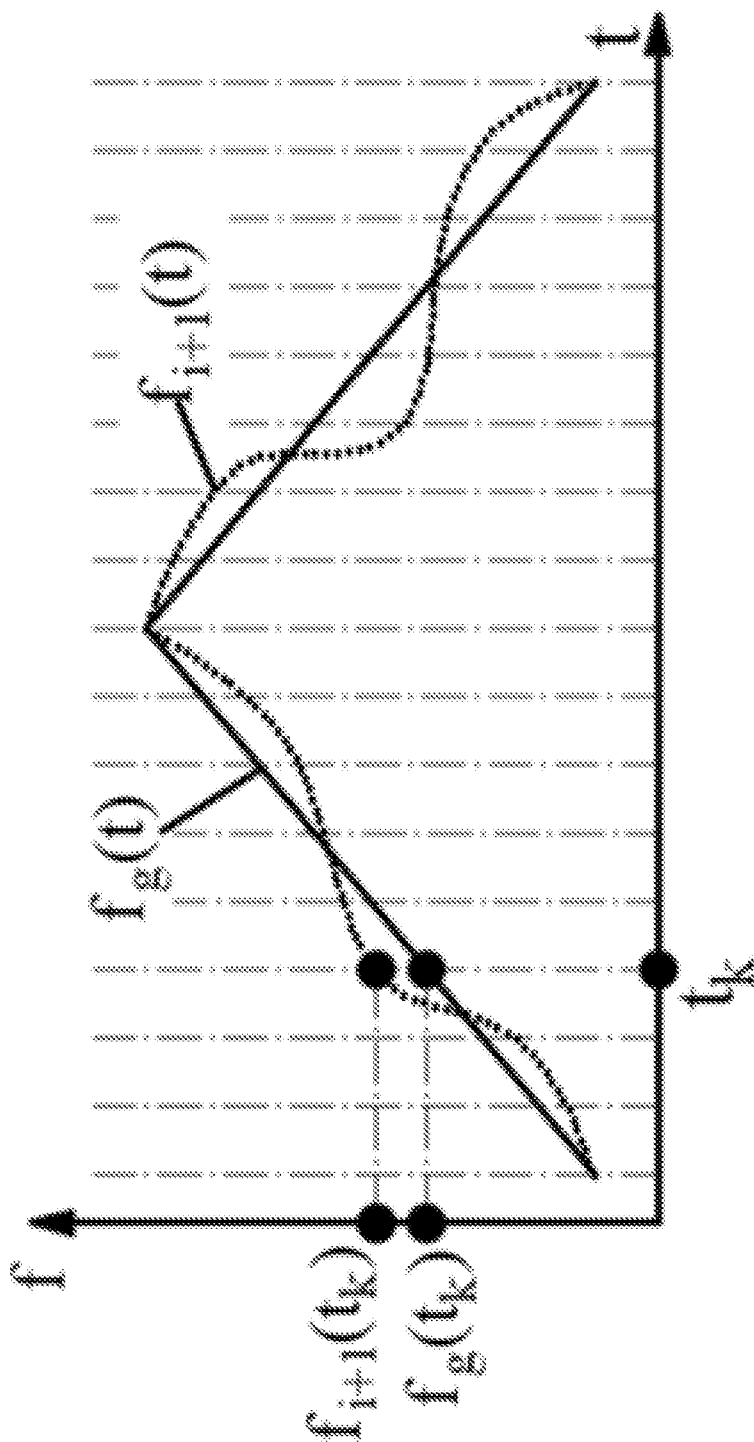
FIG. 9 is a schematic diagram of a comparison between an actual frequency signal $f_{i+1}(t)$ corresponding to the $(i+1)^{th}$ frequency modulation cycle and a target frequency modulation signal $f_g(t)$ according to an exemplary embodiment of this disclosure.

For example, after the foregoing modulation voltage signal $V_{i+1}(t)$ in the $(i+1)^{th}$ frequency modulation cycle is input into the laser device, output of the laser device can be expressed as $f_{i+1}(t)$. For example, FIG. 9 shows an actual frequency signal $f_{i+1}(t)$ corresponding to the $(i+1)^{th}$ frequency modulation cycle. Further, the $(i+1)^{th}$ frequency modulation cycle is divided into S time points. With reference to a time point $t_k$ shown in FIG. 9, k is 1, 2, . . . S. S is a positive integer, and a specific value of S can be determined based on an actual need.

S390: For a time point $t_k$, calculate a matching degree $p_k$ of an actual frequency value $f_{i+1}(t_k)$ corresponding to the time point $t_k$ in the $(i+1)^{th}$ frequency modulation cycle and a target frequency modulation value $f_g(t_k)$ corresponding to the time point $t_k$. S3100: Determine whether the foregoing matching degree satisfies a preset condition.

In an exemplary embodiment, referring to FIG. 9, the matching degree $p_k$ corresponding to the time point $t_k$ can be determined by calculating a ratio of the actual frequency value $f_{i+1}(t_k)$ to the target frequency modulation value $f_g(t_k)$. In some embodiments, matching degrees ($p_1$, $p_2$, . . . , $p_k$, . . . , $p_S$) corresponding to the S time points can be obtained. Further, absolute values of differences between the S matching degrees and 1 are calculated respectively. In this embodiment, if obtained S absolute values are all less than a first preset value, this indicates that a current modulation voltage signal has satisfied a preset requirement, the iteration can be ended, and the modulation voltage signal $V_{i+1}(t)$ corresponding to the $(i+1)^{th}$ frequency modulation cycle is used as the target modulation voltage signal. That is, the target modulation voltage signal is used as a voltage signal input into the laser device in a subsequent frequency modulation cycle. If there is an absolute value (the absolute value of the difference between the matching degree and 1) that is not less than the first preset value, referring to FIG. 3, this indicates that the current modulation voltage signal has not satisfied a preset requirement, then i+1 is assigned to i, and step S330 is further performed, to continue the foregoing iteration process.

In another exemplary embodiment, the absolute value of the difference between the actual frequency value $f_{i+1}(t_k)$ and the target frequency modulation value $f_g(t_k)$ is determined as the matching degree $p_k$ corresponding to the time point $t_k$. In some embodiments, S matching degrees ($p'_1$, $p'_2$, ..., $p'_k$, ..., $p'_S$) corresponding to the S time points respectively can be obtained. In this embodiment, if the foregoing S matching degrees are all less than the second preset value, this indicates that a current modulation voltage signal has satisfied a preset requirement, the iteration can be ended, and the modulation voltage signal $V_{i+1}(t)$ corresponding to the $(i+1)^{th}$ frequency modulation cycle is used as the target modulation voltage signal. That is, the target modulation voltage signal is used as a voltage signal input into the laser device in a subsequent frequency modulation cycle. If any of the foregoing S matching degrees is not less than the second preset value, referring to FIG. 3, this indicates that the current modulation voltage signal has not satisfied the preset requirement, then i+1 is assigned to i, and step S330 is further performed, to continue the foregoing iteration process.

It can be seen that, in the solution of performing linear frequency modulation on an optical signal provided in this embodiment of this specification, the association relationship $f_i(V)$ between the modulation voltage and the actual frequency is first determined in the $i^{th}$ frequency modulation cycle, and an input modulation voltage required for a specific actual frequency may be determined based on the association relationship. Further, the foregoing association relationship is used to control the input modulation voltage in the subsequent $j^{th}$ frequency modulation cycle. In some embodiments, a determined target frequency value at the target time point of the $j^{th}$ cycle is determined, and then the input modulation voltage required for the target frequency value is determined based on the association relationship $f_i(V)$. Therefore, the input voltage value in each frequency modulation cycle can be controlled more accurately, to achieve technical effects of a small amount of calculation and high timeliness, thereby improving the efficiency of nonlinearly calibrating linear frequency modulation of an optical signal.

In a process of performing linear frequency modulation on the light source in the related art, it is necessary to set an initial voltage step and reduce a voltage value based on the initial voltage step. Details are as follows.

The frequency signal output by the laser device is obtained after the initial modulation voltage signal $V_0(t)$ is input into the laser device. Further, correspondingly, a frequency modulation cycle is divided into a plurality of time points, and at each time point, a value of an actual frequency modulation curve and a value of an ideal target frequency modulation curve are compared:

(a) if the difference between $F_i(t_s)$ and $F_g(t_s)$ exceeds an acceptable frequency deviation range and $F_i(t_s) > F_g(t_s)$, then a frequency modulation voltage at this moment is excessively large and needs to be reduced based on the step: $V_{i+1}(t_s) = V_i(t_s) - \Delta V_i$; or (b) if the difference between $F_i(t_s)$ and $F_g(t_s)$ exceeds an acceptable frequency deviation range and $F_i(t_s) < F_g(t_s)$, then a frequency modulation voltage at this moment is excessively small and needs to be increased based on the step: $V_{i+1}(t_s) = V_i(t_s) + \Delta V_i$.

Therefore, a new frequency modulation voltage signal $V_{i+1}(t)$ can be obtained, and a voltage step can be reduced to $\Delta V_{i+1}$.

It can be seen that the solution provided in the related art has the following problems. If the initial voltage step is excessively large and/or the voltage step is reduced excessively slowly, the actual frequency modulation curve cannot be accurately determined, or the actual frequency modulation curve cannot be close to the acceptable frequency deviation range of the target frequency modulation curve. On the contrary, if the initial voltage step is excessively small and/or the voltage step is reduced excessively fast, an algorithm includes many iterations, a large amount of calculation is required, and timeliness is poor. In addition, the related art also has problems of poor stability and low reliability.

Compared with the related art, in the solution provided in this embodiment of this specification, although the method of selecting the initial voltage step and reducing the voltage step is not used and there are fewer iterations, a more ideally actual frequency modulation signal can be obtained. That is, the deviation between the actual frequency modulation signal and the target frequency modulation signal is within a preset range. In addition, the amount of calculation is small, the timeliness is high, the stability is good, and the reliability is high.

It should be noted that the foregoing figures are only used to illustrate processes included in the method in the exemplary embodiment of the present disclosure, and are not intended for limitation. The processes shown in the foregoing figures do not indicate or limit a chronological sequence of these processes. These processes may be performed synchronously or asynchronously, for example, in a plurality of modules.

An apparatus embodiment of this disclosure is provided below, and can be used to perform the method embodiments of this disclosure. For details not disclosed in this apparatus embodiment of this disclosure, refer to the method embodiments of this disclosure.

Figure 10:
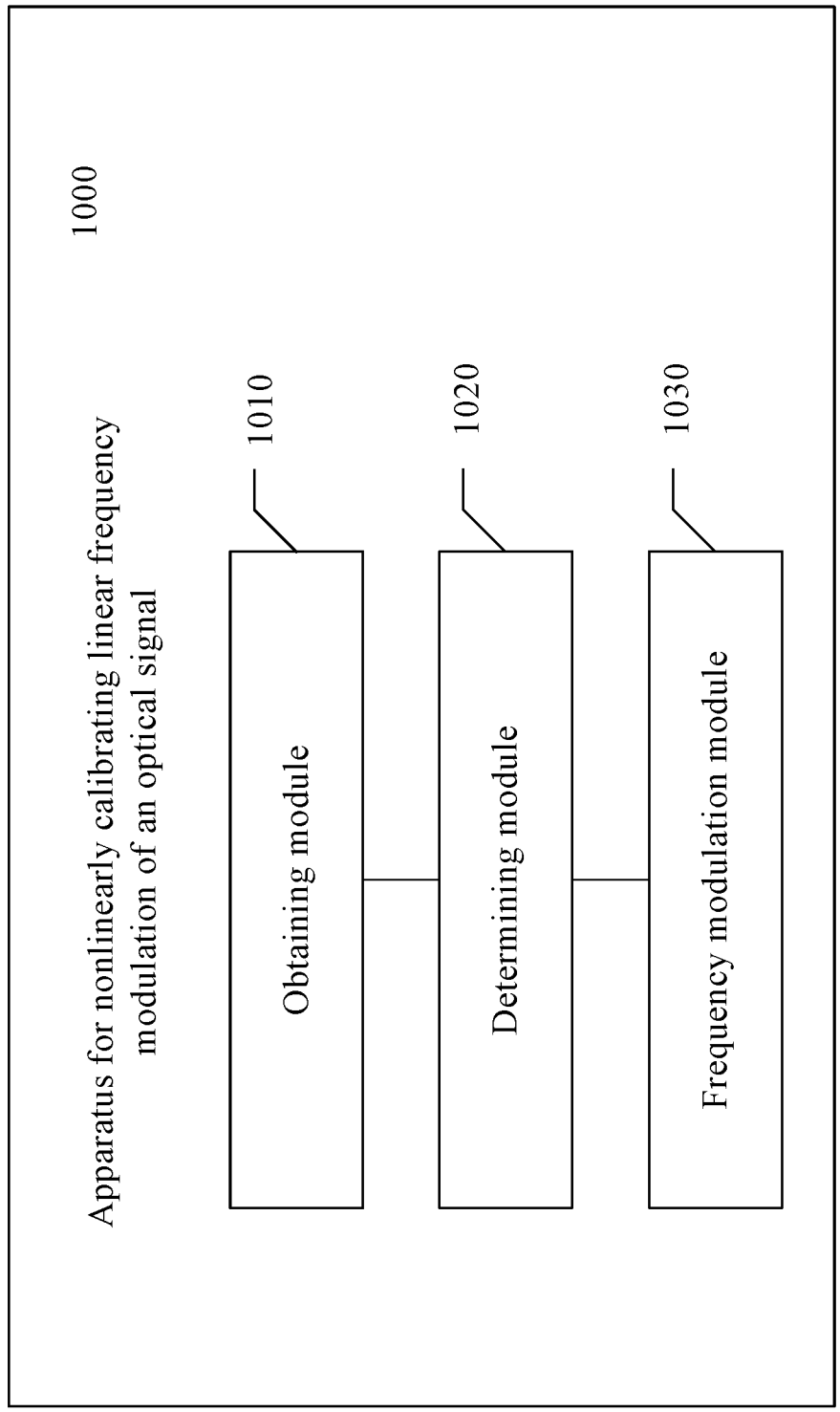
FIG. 10 is a schematic structural diagram of an apparatus for nonlinearly calibrating linear frequency modulation of an optical signal to which an embodiment of this disclosure is applicable.

FIG. 10 is a schematic structural diagram of an apparatus for nonlinearly calibrating linear frequency modulation of an optical signal to which an embodiment of this disclosure is applicable. Referring to FIG. 10, the apparatus for nonlinearly calibrating linear frequency modulation of an optical signal shown in the figure can be implemented as all or a part of an electronic device through software, hardware, or a combination thereof, or can be integrated into the electronic device or a server as an independent module.

In this embodiment of this disclosure, the apparatus 1000 for nonlinearly calibrating linear frequency modulation of an optical signal includes: an obtaining module 1010, a determining module 1020, and a frequency modulation module 1030.

The obtaining module 1010 is configured to: in an $i^{th}$ frequency modulation cycle, obtain a relationship between a modulation voltage signal $V_i(t)$ input into a light source and an actual frequency signal $f_i(t)$ of the optical signal that is output by the light source, to obtain an actual association relationship $f_i(V)$ corresponding to the $i^{th}$ frequency modulation cycle, where i is a positive integer. The determining module 1020 is configured to: based on a target frequency modulation signal $f_g(t)$ and the actual association relationship $f_i(V)$, determine a modulation voltage signal $V_j(t)$ corresponding to a $j^{th}$ frequency modulation cycle, where a value of j is i+1. The frequency modulation module 1030 is configured to input a modulation voltage signal $V_j(t)$ into the light source, to implement frequency modulation of the optical signal in the $j^{th}$ frequency modulation cycle.

Figure 11:
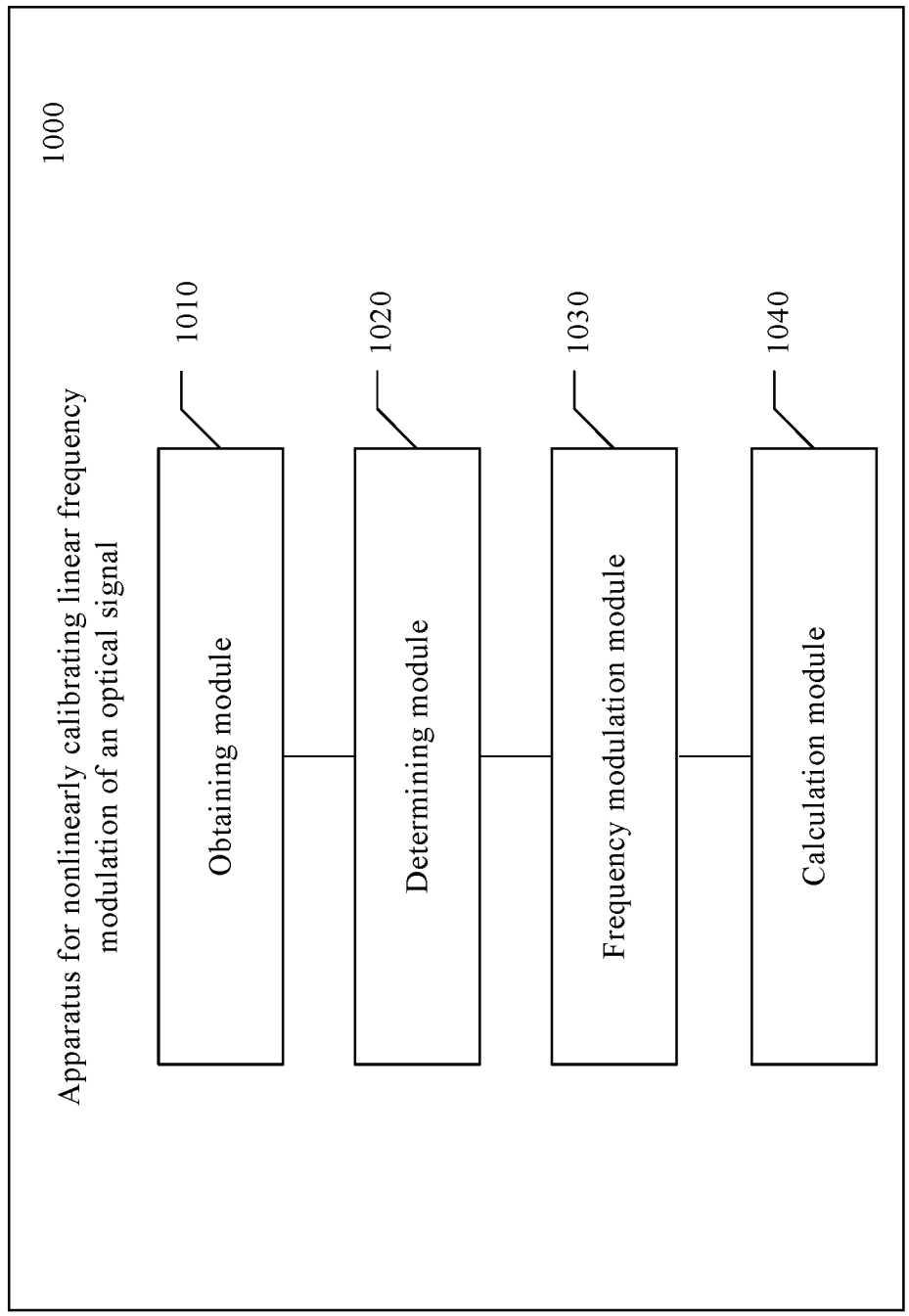
FIG. 11 is a schematic structural diagram of an apparatus for nonlinearly calibrating linear frequency modulation of an optical signal according to another embodiment of this disclosure.

FIG. 11 schematically shows a structural diagram of an apparatus for nonlinearly calibrating linear frequency modulation of an optical signal according to another exemplary embodiment of this disclosure. Referring to FIG. 11, details are as follows.

In an exemplary embodiment, based on the foregoing solution, the obtaining module 1010 is configured to: divide the $i^{th}$ frequency modulation cycle into a plurality of time points; and obtain a modulation voltage value and an actual frequency value corresponding to each of the plurality of time points, to obtain the actual association relationship $f_i(V)$.

In an exemplary embodiment, based on the foregoing solution, the determining module 1020 is configured to: divide the $j^{th}$ frequency modulation cycle into a plurality of time points; based on the target frequency modulation signal $f_g(t)$, determine target frequency values corresponding to the plurality of time points in the $j^{th}$ frequency modulation cycle; based on the actual association relationship $f_i(V)$, determine an actual modulation voltage value corresponding to each target frequency value, to obtain actual modulation voltage values corresponding to the plurality of time points in the $j^{th}$ frequency modulation cycle; and based on the actual modulation voltage values corresponding to the plurality of time points in the $j^{th}$ frequency modulation cycle, determine the modulation voltage signal $V_j(t)$ corresponding to the $j^{th}$ frequency modulation cycle.

In an exemplary embodiment, based on the foregoing solution, in the $i^{th}$ frequency modulation cycle, the frequency value changes with time monotonically; and in the $j^{th}$ frequency modulation cycle, the frequency value changes with time monotonically.

In an exemplary embodiment, based on the foregoing solution, the $i^{th}$ frequency modulation cycle includes: a first stage at which frequency increases with time monotonically and a second stage at which frequency decreases with time monotonically; and the obtaining module 1010 is configured to: in the first stage of the $i^{th}$ frequency modulation cycle, obtain a relationship between a modulation voltage signal $V_{i1}(t)$ input into the light source and an actual frequency signal $f_{i1}(t)$ of the optical signal that is output by the light source, to obtain an actual association relationship $f_{i1}(V)$, and in the second stage of the $i^{th}$ frequency modulation cycle, obtain a relationship between a modulation voltage signal $V_{i2}(t)$ input into the light source and an actual frequency signal $f_{i2}(t)$ of the optical signal that is output by the light source, to obtain an actual association relationship $f_{i2}(V)$; and determine the actual association relationship $f_{i1}(V)$ corresponding to the first stage of the $i^{th}$ frequency modulation cycle and the actual association relationship $f_{i2}(V)$ corresponding to the second stage of the $i^{th}$ frequency modulation cycle as actual association relationships $f_i(V)$ corresponding to the $i^{th}$ cycle.

In an exemplary embodiment, based on the foregoing solution, the determining module 1020 is configured to: divide a first stage of the $j^{th}$ frequency modulation cycle into a plurality of first time points; based on the target frequency modulation signal $f_g(t)$, determine first target frequency values corresponding to the plurality of first time points; based on the actual association relationship $f_{i1}(V)$, determine a first actual modulation voltage value corresponding to each first target frequency value, to obtain actual modulation voltage values corresponding to the plurality of first time points; based on the actual modulation voltage values corresponding to the plurality of first time points, determine a modulation voltage signal $V_j(t)$ corresponding to the first stage of the $j^{th}$ frequency modulation cycle; and divide a second stage of the $j^{th}$ frequency modulation cycle into a plurality of second time points; and based on the target frequency modulation signal $f_g(t)$, determine second target frequency values corresponding to the plurality of second time points;

based on the actual association relationship $f_{i2}(V)$, determine a second actual modulation voltage value corresponding to each second target frequency value, to obtain actual modulation voltage values corresponding to the plurality of second time points; and based on the actual modulation voltage values corresponding to the plurality of second time points, determine the modulation voltage signal $V_{j2}(t)$ corresponding to the second stage of the $j^{th}$ frequency modulation cycle; and determine the modulation voltage signal $V_{j1}(t)$ corresponding to the first stage of the $j^{th}$ frequency modulation cycle and the modulation voltage signal $V_{j2}(t)$ corresponding to the second stage of the $j^{th}$ frequency modulation cycle as modulation voltage signals $V_j(t)$ corresponding to the $j^{th}$ frequency modulation cycle.

In an exemplary embodiment, based on the foregoing solution, the foregoing apparatus further includes a calculation module 1040.

The calculation module 1040 is configured to: after the determining module 1020 determines a modulation voltage signal $V_j(t)$ corresponding to a $j^{th}$ frequency modulation cycle, obtain an actual frequency signal $f_j(t)$ corresponding to the $j^{th}$ frequency modulation cycle, and divide the $j^{th}$ frequency modulation cycle into a plurality of time points; calculate a matching degree of the actual frequency signal $f_j(t)$ and the target frequency modulation signal $f_g(t)$ for each time point; and if the matching degree satisfies a preset condition, determine the modulation voltage signal $V_j(t)$ corresponding to the $j^{th}$ frequency modulation cycle as the target modulation voltage signal.

In an exemplary embodiment, based on the foregoing solution, calculating a matching degree of the actual frequency signal $f_j(t)$ and the target frequency modulation signal $f_g(t)$ includes: calculating a ratio of the actual frequency signal $f_j(t)$ to the target frequency modulation signal $f_g(t)$, to obtain a matching degree corresponding to each time point. If the matching degree satisfies a preset condition, determining the modulation voltage signal $V_j(t)$ corresponding to the $j^{th}$ frequency modulation cycle as the target modulation voltage signal includes: calculating an absolute value of a difference between 1 and each matching degree corresponding to each time point. If each absolute value corresponding to each time point is less than a first preset value, determining the modulation voltage signal $V_j(t)$ corresponding to the $j^{th}$ frequency modulation cycle as the target modulation voltage signal.

Alternatively, calculating a matching degree of the actual frequency signal $f_i(t)$ and the target frequency modulation signal $f_g(t)$ includes: calculating a difference between the actual frequency signal $f_i(t)$ and the target frequency modulation signal $f_g(t)$, to obtain a matching degree corresponding to each time point. If the matching degree satisfies a preset condition, determining the modulation voltage signal $V_j(t)$ corresponding to the $j^{th}$ frequency modulation cycle as the target modulation voltage signal includes: if each matching degree corresponding to each time point is less than a second preset value, determining the modulation voltage signal $V_j(t)$ corresponding to the $j^{th}$ frequency modulation cycle as the target modulation voltage signal.

It should be noted that, when the apparatus for nonlinearly calibrating linear frequency modulation of an optical signal provided in the foregoing embodiments performs the method for nonlinearly calibrating linear frequency modulation of an optical signal, division of the foregoing functional modules is used as an example for illustration. In actual applications, the foregoing functions can be allocated to different functional modules. That is, the inner structure of the device is divided into different functional modules to implement all or some of the functions described above. In addition, embodiments of the apparatus for nonlinearly calibrating linear frequency modulation of an optical signal and the method for nonlinearly calibrating linear frequency modulation of an optical signal provided in the foregoing embodiments belong to a same concept. Therefore, for details not disclosed in the apparatus embodiments of this disclosure, refer to the foregoing embodiment of the method for nonlinearly calibrating linear frequency modulation of an optical signal in this disclosure. Details are not described herein again.

Serial numbers of the embodiments of this disclosure are only intended for description, and do not indicate advantages or disadvantages of the embodiments.

An embodiment of this disclosure further provides a computer-readable storage medium storing a computer program. When the computer program is executed by a processor, steps of the method in any one of the foregoing embodiments are implemented. The computer-readable storage medium may include, but is not limited to, any type of disk, including a floppy disk, an optical disk, a DVD, a CD-ROM, a microdrive, and a magneto-optical disk, a ROM, a RAM, an EPROM, an EEPROM, a DRAM, a VRAM, a flash memory device, a magnetic card or an optical card, nanosystem (including a molecular memory IC), or any type of medium or device suitable for storing an instruction and/or data.

An embodiment of this disclosure also provides an electronic device. The electronic device includes a memory, a processor, and a computer program stored in the memory and capable of running on the processor. When the processor executes the program, steps of the method in any one of the foregoing embodiments are implemented.

Figure 12:
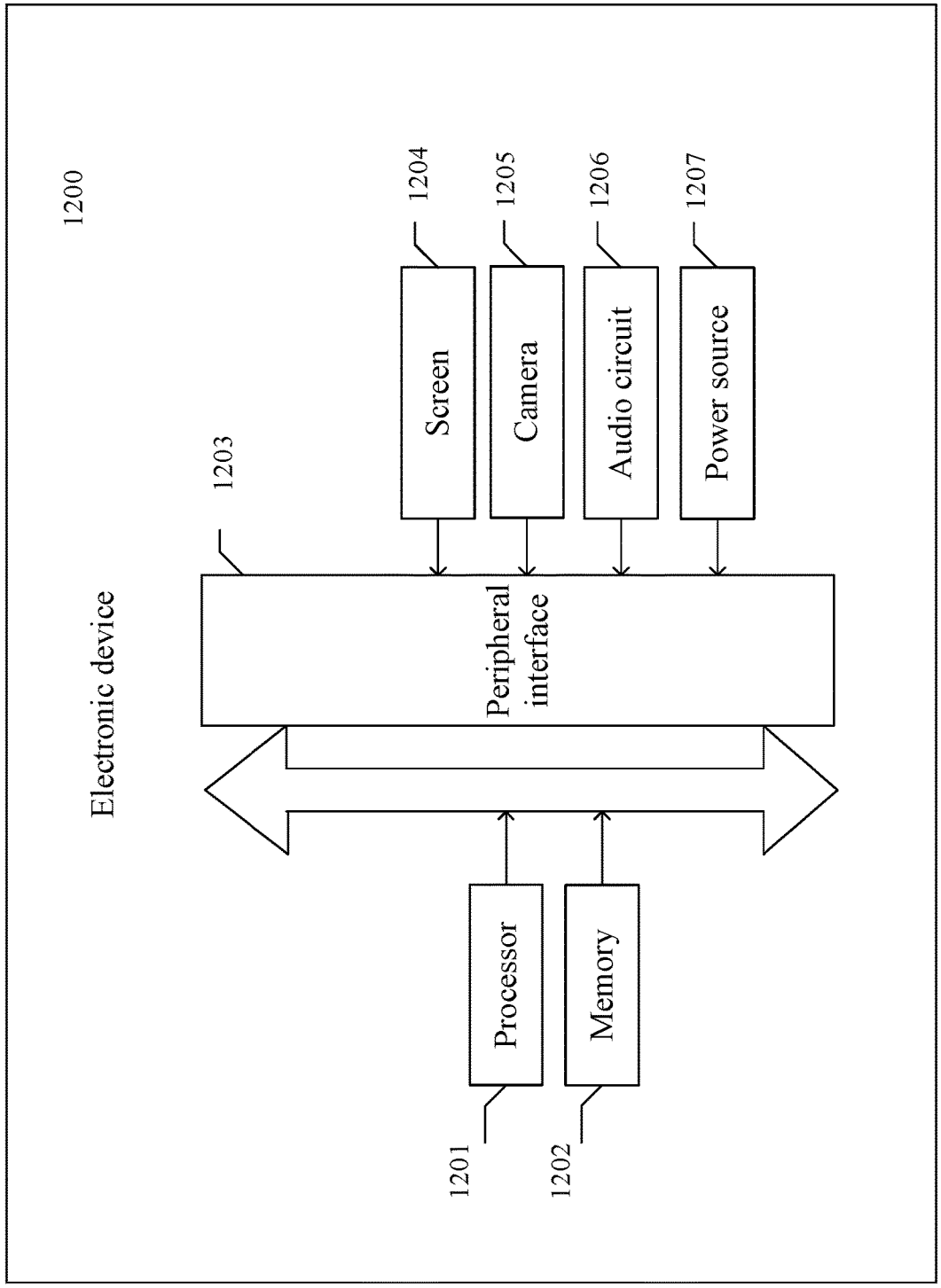
FIG. 12 is a schematic structural diagram of an electronic device applicable for implementing an embodiment of this disclosure.

FIG. 12 schematically shows a structural diagram of an electronic device according to an exemplary embodiment of this disclosure. Referring to FIG. 12, the electronic device 1200 includes: a processor 1201 and a memory 1202.

In this embodiment of this disclosure, the processor 1201 is a control center of a computer system, which may be a processor of a physical machine or a virtual machine. The processor 1201 may include one or more processing cores, such as a 4-core processor, an 8-core processor, or the like. The processor 1201 may be implemented in at least one hardware form of DSP (Digital Signal Processing), an FPGA (Field-Programmable Gate Array), or a PLA (Programmable Logic Array). The processor 1201 may also include a main processor and a coprocessor. The main processor is a processor configured to process data in a wakeup state and is also referred to as a CPU (Central Processing Unit). The coprocessor is a low-power processor configured to process data in a standby state.

In this embodiment of this disclosure, the processor 1201 is configured to: in an $i^{th}$ frequency modulation cycle, obtain a relationship between a modulation voltage signal $V_i(t)$ input into a light source and an actual frequency signal $f_i(t)$ of the optical signal that is output by the light source, to obtain an actual association relationship $f_i(V)$ corresponding to the $i^{th}$ frequency modulation cycle, where i is a positive integer; based on a target frequency modulation signal $f_g(t)$ and the actual association relationship $f_i(V)$, determine a modulation voltage signal $V_j(t)$ corresponding to a $j^{th}$ frequency modulation cycle, where a value of j is i+1; and input a modulation voltage signal $V_j(t)$ into the light source, to implement frequency modulation of the optical signal in the $j^{th}$ frequency modulation cycle.

Further, in an $i^{th}$ frequency modulation cycle, obtaining a relationship between a modulation voltage signal $V_i(t)$ input into a light source and an actual frequency signal $f_i(t)$ of the optical signal that is output by the light source, to obtain an actual association relationship $f_i(V)$ corresponding to the $i^{th}$ frequency modulation cycle includes: dividing the $i^{th}$ frequency modulation cycle into a plurality of time points; and obtaining a modulation voltage value and an actual frequency value corresponding to each of the plurality of time points, to obtain the actual association relationship $f_i(V)$.

Further, based on a target frequency modulation signal $f_g(t)$ and the actual association relationship $f_i(V)$, determining a modulation voltage signal $V_j(t)$ corresponding to a $j^{th}$ frequency modulation cycle includes: dividing the $j^{th}$ frequency modulation cycle into a plurality of time points; based on the target frequency modulation signal $f_g(t)$, determining target frequency values corresponding to the plurality of time points in the $j^{th}$ frequency modulation cycle; based on the actual association relationship $f_i(V)$, determining an actual modulation voltage value corresponding to each target frequency value, to obtain actual modulation voltage values corresponding to the plurality of time points in the $j^{th}$ frequency modulation cycle; and based on the actual modulation voltage values corresponding to the plurality of time points in the $j^{th}$ frequency modulation cycle, determining the modulation voltage signal $V_j(t)$ corresponding to the $j^{th}$ frequency modulation cycle.

Further, in the $i^{th}$ frequency modulation cycle, the frequency value changes with time monotonically; and in the $j^{th}$ frequency modulation cycle, the frequency value changes with time monotonically.

Further, the $i^{th}$ frequency modulation cycle includes: a first stage at which frequency increases with time monotonically and a second stage at which frequency decreases with time monotonically; and obtaining a relationship between a modulation voltage signal $V_i(t)$ input into a light source and an actual frequency signal $f_i(t)$ of the optical signal that is output by the light source, to obtain an actual association relationship $f_i(V)$ corresponding to the $i^{th}$ frequency modulation cycle includes: in the first stage of the $i^{th}$ frequency modulation cycle, obtaining a relationship between a modulation voltage signal $V_{i1}(t)$ input into the light source and an actual frequency signal $f_{i1}(t)$ of the optical signal that is output by the light source, to obtain an actual association relationship $f_i(V)$, and in the second stage of the $i^{th}$ frequency modulation cycle, obtaining a relationship between a modulation voltage signal $V_{i2}(t)$ input into the light source and an actual frequency signal $f_{i2}(t)$ of the optical signal that is output by the light source, to obtain an actual association relationship $f_{i2}(V)$; and determining the actual association relationship $f_{i1}(V)$ corresponding to the first stage of the $i^{th}$ frequency modulation cycle and the actual association relationship $f_{i2}(V)$ corresponding to the second stage of the $i^{th}$ frequency modulation cycle as actual association relationships $f_i(V)$ corresponding to the $i^{th}$ cycle.

Further, based on a target frequency modulation signal $f_g(t)$ and the actual association relationship $f_i(V)$, determining a modulation voltage signal $V_j(t)$ corresponding to a $j^{th}$ frequency modulation cycle includes:

dividing a first stage of the $j^{th}$ frequency modulation cycle into a plurality of first time points; based on the target frequency modulation signal $f_g(t)$, determining first target frequency values corresponding to the plurality of first time points; based on the actual association relationship $f_{i1}(V)$, determining a first actual modulation voltage value corresponding to each first target frequency value, to obtain actual modulation voltage values corresponding to the plurality of first time points; and based on the actual modulation voltage values corresponding to the plurality of first time points, determining a modulation voltage signal $V_{j1}(t)$ corresponding to the first stage of the $j^{th}$ frequency modulation cycle;

dividing a second stage of the $j^{th}$ frequency modulation cycle into a plurality of second time points; based on the target frequency modulation signal $f_g(t)$, determining second target frequency values corresponding to the plurality of second time points; and based on the actual association relationship $f_{i2}(V)$, determining a second actual modulation voltage value corresponding to each second target frequency value, to obtain actual modulation voltage values corresponding to the plurality of second time points; and based on the actual modulation voltage values corresponding to the plurality of second time points, determining the modulation voltage signal $V_{j2}(t)$ corresponding to the second stage of the $j^{th}$ frequency modulation cycle; and determining the modulation voltage signal $V_{j1}(t)$ corresponding to the first stage of the $j^{th}$ frequency modulation cycle and the modulation voltage signal $V_{j2}(t)$ corresponding to the second stage of the $j^{th}$ frequency modulation cycle as modulation voltage signals $V_j(t)$ corresponding to the $j^{th}$ frequency modulation cycle.

Further, the processor 1201 is further configured to: after a modulation voltage signal $V_j(t)$ corresponding to a $j^{th}$ frequency modulation cycle is determined, obtain an actual frequency signal $f_j(t)$ corresponding to the $j^{th}$ frequency modulation cycle, and divide the $j^{th}$ frequency modulation cycle into a plurality of time points; calculate a matching degree of the actual frequency signal $f_j(t)$ and the target frequency modulation signal $f_g(t)$ for each time point; and if the matching degree satisfies a preset condition, determine the modulation voltage signal $V_j(t)$ corresponding to the $j^{th}$ frequency modulation cycle as the target modulation voltage signal.

Further, calculating a matching degree of the actual frequency signal $f_j(t)$ and the target frequency modulation signal $f_g(t)$ includes: calculating a ratio of the actual frequency signal $f_j(t)$ to the target frequency modulation signal $f_g(t)$, to obtain a matching degree corresponding to each time point. If the matching degree satisfies a preset condition, determining the modulation voltage signal $V_j(t)$ corresponding to the $j^{th}$ frequency modulation cycle as the target modulation voltage signal includes: calculating an absolute value of a difference between 1 and the matching degree corresponding to each time point; and if an absolute value corresponding to each time point is less than a first preset value, determining the modulation voltage signal $V_j(t)$ corresponding to the $j^{th}$ frequency modulation cycle as the target modulation voltage signal.

Alternatively, calculating a matching degree of the actual frequency signal $f_j(t)$ and the target frequency modulation signal $f_g(t)$ includes: calculating a difference between the actual frequency signal $f_j(t)$ and the target frequency modulation signal $f_g(t)$, to obtain a matching degree corresponding to each time point. If the matching degree satisfies a preset condition, determining the modulation voltage signal $V_j(t)$ corresponding to the $j^{th}$ frequency modulation cycle as the target modulation voltage signal includes: if the matching degree corresponding to each time point is less than a second preset value, determining the modulation voltage signal $V_j(t)$ corresponding to the $j^{th}$ frequency modulation cycle as the target modulation voltage signal.

The memory 1202 may include one or more computer-readable storage media, and the computer-readable storage media may be non-transitory. The memory 1202 may also include a high-speed random access memory and a non-volatile memory such as one or more disk storage devices and flash storage devices. In some embodiments of this disclosure, a non-transitory computer-readable storage medium in the memory 1202 is configured to store at least one instruction, where the at least one instruction is executed by the processor 1201 to implement the method in the embodiments of this disclosure.

In some embodiments, the electronic device 1200 further includes a peripheral interface 1203 and at least one peripheral. The processor 1201, the memory 1202, and the peripheral interface 1203 can be connected through a bus or a signal cable. Each peripheral can be connected to the peripheral interface 1203 through a bus, a signal cable, or a circuit board. In some embodiments, the peripheral includes at least one of a screen 1204, a camera 1205, and an audio circuit 1206.

The peripheral interface 1203 may be configured to connect at least one peripheral related to I/O (Input/Output) to the processor 1201 and the memory 1202. In some embodiments of this disclosure, the processor 1201, the memory 1202, and the peripheral interface 1203 are integrated on the same chip or circuit board; or in some other embodiments of this disclosure, any one or two of the processor 1201. The memory 1202 and the peripheral interface 1203 may be implemented on a separate chip or circuit board. This is not specifically limited in the embodiments of this disclosure.

The screen 1204 is configured to display a UI (User Interface). The UI can include a graphic, text, an icon, a video, and any combination thereof. When the screen 1204 is a touchscreen, the screen 1204 also has the capability of collecting a touch signal on or above a surface of the screen 1204. The touch signal may be input into the processor 1201 as a control signal for processing. In this case, the screen 1204 may also be configured to provide a virtual button and/or a virtual keyboard, which is also referred to as a soft button and/or a soft keyboard. In some embodiments of this disclosure, there may be one screen 1204 provided on a front panel of the electronic device 1200; in some other embodiments of this disclosure, there may be at least two screens 1204 respectively provided on different surfaces of the electronic device 1200 or designed in a folded form; or in further embodiments of this disclosure, the screen 1204 may be a flexible screen provided on a curved or folded surface of the electronic device 1200. In addition, the screen 1204 can also be set to be in a non-rectangular irregular pattern. That is, a special-shaped screen. The screen 1204 can be made of materials such as an LCD (Liquid Crystal Display) and an OLED (Organic Light-Emitting Diode).

The camera 1205 is configured to collect an image or a video. In some embodiments, the camera 1205 includes a front-facing camera and a rear-facing camera. Usually, the front-facing camera is provided on the front panel of the electronic device, and the rear-facing camera is provided on the back of the electronic device. In some embodiments, there are at least two rear-facing cameras, and the at least two rear-facing cameras each are any one of a main camera, a depth-of-field camera, a wide-angle camera, or a telephoto camera, to integrate the main camera with the depth-of-field camera for a bokeh function and integrate the main camera with the wide-angle camera to implement panoramic photo shooting and VR (Virtual Reality) shooting functions or other integrated shooting functions. In some embodiments of this disclosure, the camera 1205 may also include a flash. The flash can be a single-color temperature flash or a dual-color temperature flash. The dual-color temperature flash refers to a combination of a warm light flash and a cold light flash and can be configured to compensate for light at different color temperature.

The audio circuit 1206 may include a microphone and a speaker. The microphone is configured to collect sound waves of a user and an environment, convert the sound waves into an electrical signal, and input the electrical signal into the processor 1201 for processing. For a purpose of stereo collection or noise reduction, there may be a plurality of microphones provided in different parts of the electronic device 1200. The microphone may also be an array microphone or an omnidirectional collection microphone.

The power supply 1207 is configured to supply power to various components in the electronic device 1200. The power supply 1207 may be an alternating current power supply, a direct current power supply, a disposable battery, or a rechargeable battery. When the power supply 1207 includes the rechargeable battery, the rechargeable battery may be a wired rechargeable battery or a wireless rechargeable battery. The wired rechargeable battery is a battery charged through a cable and the wireless rechargeable battery is a battery charged through a wireless coil. The rechargeable battery can also be configured to support quick charging technology.

The structural block diagram of the electronic device shown in the embodiments of this disclosure imposes no limitation on the electronic device 1200, and the electronic device 1200 may include more or fewer components than those shown in the figure, or combine some components, or use different component arrangements.

In the descriptions of this disclosure, it should be understood that the terms such as "first" and "second" are merely intended for description, instead of an indication or implication of relative importance. A person of ordinary skill in the art may understand specific meanings of the foregoing terms in this disclosure according to a specific situation. In addition, in the descriptions of this disclosure, "a plurality of" means two or more unless otherwise specified. Herein, "and/or" is an association relationship for describing associated objects and indicates that three relationships may exist. For example, A and/or B may mean the following three cases: only A exists, both A and B exist, and only B exists. The character "/" generally indicates an "or" relationship between the associated objects.

The foregoing descriptions are only specific implementations of this disclosure, but are not intended to limit the protection scope of this disclosure. Any variation or replacement readily figured out by a person skilled in the art within the technical scope disclosed in this disclosure shall fall within the protection scope of this disclosure. Accordingly, any equivalent changes made in accordance with the claims of this disclosure shall still fall within the scope of this disclosure.

What is claimed is:

1. A method for nonlinearly calibrating linear frequency modulation of an optical signal, comprising:

in an $i^{th}$ frequency modulation cycle, obtaining a relationship between a modulation voltage signal $V_i(t)$ input into a light source and an actual frequency signal $f_i(t)$ of an optical signal that is output by the light source, to obtain an actual association relationship $f_i(V)$ corresponding to the $i^{th}$ frequency modulation cycle, wherein i is a positive integer;

based on a target frequency modulation signal $f_g(t)$ and the actual association relationship $f_i(V)$, determining a modulation voltage signal $V_j(t)$ corresponding to a $j^{th}$ frequency modulation cycle, wherein a value of j is i+1; and inputting the modulation voltage signal $V_j(t)$ into the light source, to implement frequency modulation of the optical signal in the $j^{th}$ frequency modulation cycle, wherein based on the target frequency modulation signal $f_g(t)$ and the actual association relationship $f_i(V)$, determining the modulation voltage signal $V_j(t)$ corresponding to the $j^{th}$ frequency modulation cycle comprises:

dividing the $i^{th}$ frequency modulation cycle into a plurality of time points;

based on the target frequency modulation signal $f_g(t)$, determining target frequency values corresponding to the plurality of time points in the $j^{th}$ frequency modulation cycle;

based on the actual association relationship $f_i(V)$, determining an actual modulation voltage value corresponding to each target frequency value, to obtain actual modulation voltage values corresponding to the plurality of time points in the $j^{th}$ frequency modulation cycle; and based on the actual modulation voltage values corresponding to the plurality of time points in the $j^{th}$ frequency modulation cycle, determining the modulation voltage signal $V_j(t)$ corresponding to the $j^{th}$ frequency modulation cycle.

2. The method according to claim 1, wherein in the $i^{th}$ frequency modulation cycle, obtaining the relationship between the modulation voltage signal $V_i(t)$ input into the light source and the actual frequency signal $f_i(t)$ of the optical signal that is output by the light source, to obtain the actual association relationship $f_i(V)$ corresponding to the $i^{th}$ frequency modulation cycle comprises:

dividing the $i^{th}$ frequency modulation cycle into a plurality of time points; and obtaining a modulation voltage value and an actual frequency value corresponding to each of the plurality of time points, to obtain the actual association relationship $f_i(V)$.

3. The method according to claim 1, wherein in the $i^{th}$ frequency modulation cycle, a frequency value changes with time monotonically; and in the $j^{th}$ frequency modulation cycle, the frequency value changes with time monotonically.

4. The method according to claim 1, wherein the $i^{th}$ frequency modulation cycle comprises a first stage at which frequency increases with time monotonically and a second stage at which frequency decreases with time monotonically; and obtaining the relationship between the modulation voltage signal $V_i(t)$ input into the light source and the actual frequency signal $f_i(t)$ of the optical signal that is output by the light source, to obtain the actual association relationship $f_i(V)$ corresponding to the $i^{th}$ frequency modulation cycle comprises:

in the first stage of the $i^{th}$ frequency modulation cycle, obtaining a relationship between a modulation voltage signal $Vi1(t)$ input into the light source and an actual frequency signal $fi1(t)$ of the optical signal that is output by the light source, to obtain an actual association relationship $fi1(V)$, and in the second stage of the $i^{th}$ frequency modulation cycle, obtaining a relationship between a modulation voltage signal $Vi2(t)$ input into the light source and an actual frequency signal $fi2(t)$ of the optical signal that is output by the light source, to obtain an actual association relationship $fi2(V)$; and determining the actual association relationship $fi1(V)$ corresponding to the first stage of the $i^{th}$ frequency modulation cycle and the actual association relationship $fi2(V)$ corresponding to the second stage of the $i^{th}$ frequency modulation cycle as actual association relationships $f_i(V)$ corresponding to the $i^{th}$ frequency modulation cycle.

5. The method according to claim 4, wherein based on the target frequency modulation signal $f_g(t)$ and the actual association relationship $f_i(V)$, determining the modulation voltage signal $V_i(t)$ corresponding to the $j^{th}$ frequency modulation cycle comprises:

dividing a first stage of the $j^{th}$ frequency modulation cycle into a plurality of first time points;

based on the target frequency modulation signal $f_g(t)$, determining first target frequency values corresponding to the plurality of first time points;

based on the actual association relationship $fi1(V)$, determining a first actual modulation voltage value corresponding to each first target frequency value, to obtain actual modulation voltage values corresponding to the plurality of first time points;

based on the actual modulation voltage values corresponding to the plurality of first time points, determining a modulation voltage signal $Vj1(t)$ corresponding to the first stage of the $j^{th}$ frequency modulation cycle; and dividing a second stage of the $j^{th}$ frequency modulation cycle into a plurality of second time points;

based on the target frequency modulation signal $f_g(t)$, determining second target frequency values corresponding to the plurality of second time points;

based on the actual association relationship $fi2(V)$, determining a second actual modulation voltage value corresponding to each second target frequency value, to obtain actual modulation voltage values corresponding to the plurality of second time points;

based on the actual modulation voltage values corresponding to the plurality of second time points, determining a modulation voltage signal $Vj2(t)$ corresponding to the second stage of the $j^{th}$ frequency modulation cycle; and determining the modulation voltage signal $Vj1(t)$ corresponding to the first stage of the $j^{th}$ frequency modulation cycle and the modulation voltage signal $Vj2(t)$ corresponding to the second stage of the $j^{th}$ frequency modulation cycle as modulation voltage signals $V_j(t)$ corresponding to the $j^{th}$ frequency modulation cycle.

6. The method according to claim 4, wherein after determining the modulation voltage signal $V_j(t)$ corresponding to the $j^{th}$ frequency modulation cycle, the method further comprises:

obtaining an actual frequency signal $f_j(t)$ corresponding to the $j^{th}$ frequency modulation cycle, and dividing the $j^{th}$ frequency modulation cycle into a plurality of time points;

calculating a matching degree of the actual frequency signal $f_j(t)$ and the target frequency modulation signal $f_g(t)$ for each time point; and in response to the matching degree satisfying a preset condition, determining the modulation voltage signal $V_j(t)$ corresponding to the $j^{th}$ frequency modulation cycle as a target modulation voltage signal.

7. The method according to claim 6, wherein calculating the matching degree of the actual frequency signal $f_j(t)$ and the target frequency modulation signal $f_g(t)$ comprises:

calculating a ratio of the actual frequency signal $f_j(t)$ to the target frequency modulation signal $f_g(t)$, to obtain a matching degree corresponding to each time point, wherein in response to the matching degree satisfying a preset condition, determining the modulation voltage signal $V_j(t)$ corresponding to the $j^{th}$ frequency modulation cycle as the target modulation voltage signal comprises:

calculating an absolute value of a difference between 1 and the matching degree corresponding to each time point; and in response to each absolute value corresponding to each time point being less than a first preset value, determining the modulation voltage signal $V_j(t)$ corresponding to the $j^{th}$ frequency modulation cycle as the target modulation voltage signal.

8. The method according to claim 6, wherein calculating the matching degree of the actual frequency signal $f_j(t)$ and the target frequency modulation signal $f_g(t)$ comprises:

calculating a difference between the actual frequency signal $f_j(t)$ and the target frequency modulation signal $f_g(t)$, to obtain a matching degree corresponding to each time point, wherein in response to the matching degree satisfying a preset condition, determining the modulation voltage signal $V_j(t)$ corresponding to the $j^{th}$ frequency modulation cycle as the target modulation voltage signal comprises:

in response to each matching degree corresponding to each time point being less than a second preset value, determining the modulation voltage signal $V_j(t)$ corresponding to the $j^{th}$ frequency modulation cycle as the target modulation voltage signal.

9. An electronic device, wherein the electronic device is configured to perform nonlinearly calibrating linear frequency modulation of an optical signal output by a light source, and the electronic device comprises a memory, a processor, and a computer program stored in the memory and capable of running on the processor, wherein when the processor executes the computer program, implements operations for nonlinearly calibrating linear frequency modulation of an optical signal, and wherein the operations comprise:

in an $i^{th}$ frequency modulation cycle, obtaining a relationship between a modulation voltage signal $V_i(t)$ input into the light source and an actual frequency signal $f_t(t)$ of an optical signal that is output by the light source, to obtain an actual association relationship $f_i(V)$ corresponding to the $i^{th}$ frequency modulation cycle, wherein i is a positive integer;

based on a target frequency modulation signal $f_g(t)$ and the actual association relationship $f_i(V)$, determining a modulation voltage signal $V_j(t)$ corresponding to a $j^{th}$ frequency modulation cycle, wherein a value of j is i+1; and inputting the modulation voltage signal $V_j(t)$ into the light source, to implement frequency modulation of the optical signal in the $j^{th}$ frequency modulation cycle, wherein based on the target frequency modulation signal $f_g(t)$ and the actual association relationship $f_i(V)$, determining the modulation voltage signal $V_j(t)$ corresponding to the $j^{th}$ frequency modulation cycle comprises:

dividing the $j^{th}$ frequency modulation cycle into a plurality of time points;

based on the target frequency modulation signal $f_g(t)$, determining target frequency values corresponding to the plurality of time points in the $j^{th}$ frequency modulation cycle;

based on the actual association relationship $f_i(V)$, determining an actual modulation voltage value corresponding to each target frequency value, to obtain actual modulation voltage values corresponding to the plurality of time points in the $j^{th}$ frequency modulation cycle; and based on the actual modulation voltage values corresponding to the plurality of time points in the $j^{th}$ frequency modulation cycle, determining the modulation voltage signal $V_j(t)$ corresponding to the $j^{th}$ frequency modulation cycle.

* * * * *